United States Patent
Haller

(10) Patent No.: US 9,827,881 B2
(45) Date of Patent: *Nov. 28, 2017

(54) VEHICLE SEAT WITH ADJUSTABLE BACKREST

(71) Applicant: GRAMMER AG, Amberg (DE)

(72) Inventor: Erwin Haller, Birgland (DE)

(73) Assignee: GRAMMER AG, Amberg (DE)

( * ) Notice: Subject to any disclaimer, the term of this patent is extended or adjusted under 35 U.S.C. 154(b) by 38 days.

This patent is subject to a terminal disclaimer.

(21) Appl. No.: 14/824,249

(22) Filed: Aug. 12, 2015

(65) Prior Publication Data
US 2016/0046222 A1 Feb. 18, 2016

(30) Foreign Application Priority Data
Aug. 13, 2014 (DE) .................... 10 2014 011 884

(51) Int. Cl.
*B60N 2/02* (2006.01)
*B60N 2/22* (2006.01)
(Continued)

(52) U.S. Cl.
CPC ............... *B60N 2/22* (2013.01); *B60N 2/449* (2013.01); *B60N 2/643* (2013.01); *B60N 2/68* (2013.01); *B60N 2002/0288* (2013.01)

(58) Field of Classification Search
CPC ........ B60N 2/22; B60N 2/2213; B60N 2/222; B60N 2/2231; B60N 2/224; B60N 2/23;
(Continued)

(56) References Cited

U.S. PATENT DOCUMENTS

| 567,491 A | 9/1896 | Murphy |
| 633,012 A | 9/1899 | Kidd et al. |

(Continued)

FOREIGN PATENT DOCUMENTS

| CN | 201124776 | 10/2008 |
| DE | 69111471 | 3/1996 |

(Continued)

OTHER PUBLICATIONS

Extended Search Report for European Patent Application No. 15180746.8 dated Dec. 11, 2015, 3 pages.
(Continued)

*Primary Examiner* — Robert Canfield
(74) *Attorney, Agent, or Firm* — Sheridan Ross PC

(57) ABSTRACT

The invention relates to a vehicle seat comprising a seat part and a backrest, wherein the backrest comprises at least one left-hand backrest longitudinal support at least one middle backrest longitudinal support and at least one right-hand backrest longitudinal support extending in the vertical direction of the backrest. The backrest longitudinal supports are each connected to the seat part and/or a seat-part frame in a lower region and comprise at least one cushion element. The backrest longitudinal supports are hingedly connected to the seat part and/or the seat-part frame and are interconnected by means of an elongate backrest cross strut, wherein it is possible to vary a distance between at least two backrest longitudinal supports by displacing the at least one backrest cross strut along the vertical direction of the backrest in the upper region of the backrest.

16 Claims, 9 Drawing Sheets

(51) Int. Cl.
*B60N 2/44* (2006.01)
*B60N 2/64* (2006.01)
*B60N 2/68* (2006.01)

(58) Field of Classification Search
CPC ........ B60N 2/231; B60N 2/449; B60N 2/643; B60N 2/68; B60N 2002/0288; A47C 7/40; A47C 7/407
USPC ..................................................... 297/452.4
See application file for complete search history.

(56) References Cited

U.S. PATENT DOCUMENTS

| | | | |
|---|---|---|---|
| 1,400,717 | A | 12/1921 | Benson et al. |
| 1,508,859 | A | 9/1924 | Schoenhoff |
| 2,534,009 | A * | 12/1950 | Freasier ................ A47C 7/425 297/230.14 |
| 4,558,904 | A | 12/1985 | Schultz |
| 5,671,976 | A | 9/1997 | Fredrick |
| 6,033,026 | A | 3/2000 | Tseng |
| 6,352,307 | B1 | 3/2002 | Engman |
| 6,588,836 | B1 | 7/2003 | Lo |
| 7,354,107 | B2 | 4/2008 | Kohl et al. |
| 8,141,952 | B2 | 3/2012 | Poniatowski |
| 8,991,926 | B2 * | 3/2015 | Johansson ................ A61G 5/12 280/304.1 |
| 2014/0103690 | A1 * | 4/2014 | Haller ................ B60N 2/2222 297/301.1 |
| 2016/0046221 | A1 * | 2/2016 | Haller ................ B60N 2/643 297/284.2 |
| 2016/0095443 | A1 | 4/2016 | Brodbeck |

FOREIGN PATENT DOCUMENTS

| | | |
|---|---|---|
| DE | 19837843 | 2/2000 |
| DE | 102006020671 | 11/2007 |
| DE | 102012109710 | 6/2014 |
| EP | 2719575 | 4/2014 |
| FR | 2828150 | 2/2003 |
| FR | 2972399 | 9/2012 |
| JP | H02-125651 | 10/1990 |
| JP | H03-3256 | 1/1991 |
| JP | H06-14597 | 4/1994 |
| WO | WO 2007/131461 | 11/2007 |

OTHER PUBLICATIONS

Extended Search Report for European Patent Application No. 15180725.2 dated Dec. 10, 2015, 3 pages.
U.S. Appl. No. 14/824,232, filed Aug. 12, 2015, Haller.
Official Action (with English machine translation) for Chinese Patent Application No. 2015104967189, dated Mar. 28, 2017, 27 pages.
Official Action for U.S. Appl. No. 14/824,232, dated Jan. 12, 2017, 14 pages.
Official Action (with English translation) for Chinese Patent Application No. 2015104978395 dated Apr. 26, 2017, 17 pages.
Notice of Allowance for U.S. Appl. No. 14/824,232, dated May 18, 2017, 16 pages.

* cited by examiner

VEHICLE SEAT WITH ADJUSTABLE BACKREST

CROSS-REFERENCE TO RELATED APPLICATIONS

This application claims the benefit of German Application No. 10 2014 011 884.3 filed Aug. 13, 2014, the contents of which are incorporated herein by reference.

The invention relates to a vehicle seat comprising a seat part and a backrest, the backrest comprising at least one left-hand backrest longitudinal support extending in the vertical direction of the backrest, at least one middle backrest longitudinal support extending in the vertical direction of the backrest and at least one right-hand backrest longitudinal support extending in the vertical direction of the backrest, the backrest longitudinal supports each being attached to the seat part and/or a seat-part frame in a lower end region and comprising at least one cushion element.

Vehicle seats comprising a seat part and a backrest are known from the prior art, in which seats the width of the backrest is narrow or wide depending on a driver or passenger respectively. However, these vehicle seats only have a single backrest width, and so the seating comfort decreases when a driver of a different height and width sits on the seat, for example, since either the backrest is too narrow for the driver, as a result of which the driver does not have optimal back support from the backrest since they do not fit into the shape of the backrest, or the backrest is too wide, as a result of which there is no longer any lateral support. Such seats are also expensive and complex to produce, since a large range of different backrest widths need to be available.

Furthermore, the prior art also discloses child seats which make it possible to widen the backrest by extending said backrest, by pulling out cushion elements which are arranged inside the backrest, or by attaching additional cushion elements to the backrest. In this case, supports or cushion elements respectively inside the backrest are for example pulled outwards over the entire height of the backrest, as a result of which it is also possible to use the child seat for a longer period of time as the child grows up. However, such a structure does not meet the requirements of a vehicle seat in terms of safety since the supports which are pulled out or attached respectively do not allow the driver to be supported safely. Furthermore, by pulling out the cushion parts over the entirety of the vertical direction, the width of the backrest is also increased in the pelvic region, and this leads to a lack of support in this region.

Therefore, it is the object of the present invention to further develop generic vehicle seats in such a way in order to make it possible, by way of a simple structure of the seat, for the driver or passenger respectively to rapidly and safely adjust the backrest in an upper region, with optimal support in the pelvic region at the same time, and to rapidly and simply adjust the seat to make it comfortable for the passenger. At the same time, such a seat minimises production costs since it is then possible to set various widths of the backrest using one seat.

This object is solved according to the features of the present disclosure.

The central concept of the invention is a vehicle seat comprising a seat part and a backrest, the backrest comprising at least one left-hand backrest longitudinal support extending in the vertical direction of the backrest, at least one middle backrest longitudinal support extending in the vertical direction of the backrest, and at least one right-hand backrest longitudinal support extending in the vertical direction of the backrest, the backrest longitudinal supports each being attached to the seat part and/or a seat-part frame in a lower end region and comprising at least one cushion element. The backrest longitudinal supports are hingedly connected in their lower end regions to the seat part and/or the seat-part frame, and are interconnected by means of at least one elongate backrest cross strut arranged in an upper region of the backrest, as a result of which it is possible to vary a distance between at least two backrest longitudinal supports by displacing the at least one backrest cross strut in the vertical direction of the backrest in the upper region of the backrest.

Here, a "backrest longitudinal support" is understood to be an element which is connected at its lower end region to the seat part and/or the seat-part frame and extends preferably continuously in the vertical direction of the backrest as far as to an upper end region.

Likewise, the backrest cross strut is an element which extends substantially in the width direction of the seat and is preferably connected to the backrest longitudinal supports. In this case, it is conceivable for the backrest cross strut to be straight or curved. It is also conceivable for the length of the backrest cross strut to be variable. Furthermore, it is also possible for the backrest to consist of a resilient and/or deformable material, expandable materials also being conceivable.

In this context, the backrest may be a fixed backrest or a backrest which can swivel about an axis relative to the seat part.

In the process, the backrest longitudinal supports can each comprise at least one separate cushion element or be interconnected by means of one or more cushion parts. For example, the backrest can comprise a continuous cushion part on the backrest longitudinal supports, or each backrest longitudinal support comprises a separate cushion part in each case.

Owing to this design, it is possible for a person sitting on such a vehicle seat according to the invention to individually adjust the width of the backrest in an upper region, that is to say in the region of the chest and shoulders respectively, to the width of the chest and shoulders respectively of the driver in question. As a result, it is also possible to optimally adjust the width of the backrest in the upper region of the backrest and thus the seating comfort to the requirements of the respective driver without great complexity when the driver changes.

It is desirable for it to be possible to vary the distance, even during normal driving operation, since, for example, an armrest which is attached to the seat and to which a joystick or the like can be attached brings about a change in the arm position and at the same time a change to the width of the body, in particular a widening in the shoulder region in this case. By changing the width of the backrest in this region, comfortable support can be ensured by the backrest when a joystick or the like is being operated.

Even after the backrest width has been adjusted, the width remains unchanged in a lower region of the backrest, for example in the region of the hips. As a result, support is still provided, particularly in the lateral direction of the backrest. It is not necessary to change the width in the lower region since the physique of an adult generally does not differ significantly in this region, unlike the upper back region of the driver.

Furthermore, it is ensured that the driver is safely supported in each setting of the backrest, since cushion parts are not pulled out or attached respectively, as in the prior art, but rather the shape or the arrangement respectively of the backrest components to which at least one cushion element is attached, in particular the backrest longitudinal supports, is changed in order to vary the width. As a result, the driver's back is still supported by the robust components of the backrest.

The at least one backrest cross strut is preferably fastened by a first end to the left-hand backrest longitudinal support and by a second end to the right-hand backrest longitudinal support.

By means of the present invention, a particularly simple structure of the backrest is also provided by the left-hand, right-hand and middle backrest longitudinal supports and the at least one backrest cross strut, the at least one backrest cross strut preferably being connected to the backrest longitudinal supports. As a result, it is possible to further stabilise the backrest by connecting the backrest supports to the at least one backrest cross strut.

The middle backrest longitudinal support makes it possible for the driver to be well supported in the region of the spinal column, in particular when the middle backrest longitudinal support is arranged in the centre of the driver's back, i.e. in the region of the spinal column.

Since the backrest longitudinal supports are each hingedly connected in their lower regions to the seat part and/or the seat-part frame, the backrest can also swivel relative to the seat part by the backrest longitudinal supports each being pivoted about a pivot axis. In this respect, it is conceivable for these pivot axes to not only be parallel, but to each form an angle relative to one another and to be located in a common plane or even to be skew with respect to one another. When the pivot axes each form an angle relative to one another and are located in a common plane, the swivel of the backrest is a helical or torsional swivel respectively.

When the backrest swivels in such a manner, the shape of the backrest adapts to the ergonomics of the person, in particular when the upper body is rotated into a working position facing backwards.

According to the invention, the distance between at least two backrest longitudinal supports is varied by the at least one backrest cross strut being displaced in the vertical direction of the backrest. More specifically, for example, the connections of the backrest cross strut to the left-hand and right-hand backrest longitudinal support are fixed, while the connections of the middle backrest longitudinal support to the backrest cross strut can move along the vertical direction of the backrest. The distance is thus varied by the at least one backrest cross strut changing its position or location respectively. Owing to the aforementioned arrangement of the backrest cross strut or the connections thereof to the backrest longitudinal supports respectively, the backrest cross strut, which is in a horizontal position to begin with, is for example moved into a position at an angle to the horizontal position, the length projected onto the horizontal position varying as a result. Consequently, the distance and the width respectively of the backrest in general are varied overall. A change in location of this type corresponds to a reduction in the distance. In this respect, displacement of the backrest cross strut in the opposite direction, i.e. into a horizontal position from a position at an angle to the horizontal position, corresponds to an increase in the distance or in the width of the backrest respectively.

Instead of using just one backrest cross strut, it is a preferred embodiment to use two different backrest cross struts. In this case, said embodiment provides a first backrest cross strut arranged between the left-hand and the middle backrest longitudinal support and a second backrest cross strut arranged between the right-hand and the middle backrest longitudinal support, the first and/or the second backrest cross strut being displaceable along the vertical direction of the backrest.

In the process, the first backrest cross strut is preferably fastened by a first end to the left-hand backrest longitudinal support and by a second end to the middle backrest longitudinal support and the second backrest cross strut is fastened by a first end to the right-hand backrest longitudinal support and by a second end to the middle backrest longitudinal support.

By using a first and a second backrest cross strut, it is particularly possible to displace the first and second backrest cross strut separately from one another along the vertical direction of the backrest. The backrest cross struts can be displaced directly or indirectly. As a result, a driver can accordingly adapt the distance or the width respectively of the backrest separately on the left-hand side and right-hand side, depending on the driver's requirements, for example owing to a spinal curvature or specific working positions which face backwards for example.

In particular, the use of two backrest cross struts is also advantageous for possible swiveling of the backrest, since the upper regions of the respective backrest longitudinal supports can follow the helical swiveling of the backrest more effectively as a result.

In this case, it is also particularly advantageous for the at least one backrest cross strut to be hingedly connected to the backrest longitudinal supports, whereby the above-described helical swiveling can be followed particularly effectively. In addition, the position of the at least one backrest cross strut can be changed accordingly in a simple manner by a hinged connection of this type, and this thus means that the distance can be varied in a simple manner.

Instead of or in addition to the hinged connection, a type of fastening is also conceivable whereby the at least one backrest cross strut is fastened to the backrest longitudinal supports in a displaceable manner. In this case, displacement in both the vertical direction of the backrest and the width direction of the backrest is conceivable.

It is particularly advantageous for the two ends of the first and second backrest cross strut to be fastened in a displaceable manner, preferably to the middle backrest longitudinal support. In this case, the first ends, which are fastened to the left-hand or right-hand backrest longitudinal support, respectively, are preferably rigidly or hingedly attached. This therefore means that the first ends are stationary and the second ends can move in the vertical direction of the backrest. This arrangement also reduces the projected length, and overall this leads to a variation in the distance.

A particularly preferred embodiment provides that the at least one backrest cross strut is displaced by means of at least one displacement device. In the process, it is advantageous for a first and a second backrest cross strut to be provided and for these to be connected to the at least one displacement device. Preferably, the at least one displacement device is attached to the middle backrest longitudinal support so that the first and the second backrest cross struts are fastened to the displacement device by their second ends in each case. However, any arrangement or distribution respectively of the at least one displacement device on the backrest longitudinal supports is possible and conceivable.

The displacement device can either already be integrated in the backrest longitudinal support or can be attached to the backrest longitudinal supports subsequently, i.e. in a retrofittable manner. Subsequent attachment can be carried out in different ways, such as welding to the backrest longitudinal supports, screwing or riveting to the backrest longitudinal supports. The displacement device is designed such as to allow a movement in the vertical direction of the backrest.

The at least one displacement device comprises at least one of the following: at least one motor which can travel along the vertical direction of the backrest, at least one rotary spindle, at least one pneumatically operated lifting cylinder, at least one spring element and at least one snap-in apparatus.

The motor is preferably an electric motor. It is therefore conceivable for the displacement device to be operated electrically and/or manually. For example, it is conceivable for the rotary spindle to be driven by a motor, while it is also possible for the motor to be disconnected and for the rotary spindle to be moved by hand.

Preferably, the displacement device comprises a moving element to which the backrest cross struts are fastened, for example by their second ends as described above, and which can be moved by the motor and the like in the vertical direction of the backrest.

Preferably, this moving element is guided by a guide rail. As a result, reliable guidance of the moving element is ensured. In this case, the guide rail can be an integrated part of the displacement device or a separate part which is arranged on the displacement device and/or the backrest longitudinal support.

Preferably, the guide rail is a separate part in order to ensure that it can be replaced. It is also a preferred embodiment for the backrest cross strut to be releasably connected to the backrest longitudinal supports. Likewise, it is advantageous for the backrest longitudinal supports to also be releasably connected to the seat part and/or to the seat-part frame. As a result, it is generally possible to replace individual components of the backrest and to optionally also retrofit a displacement device as described above.

However, it is also conceivable for the respective components, in particular the at least one backrest cross strut and the backrest longitudinal supports, to be permanently interconnected.

A wide range of materials can be selected for the above-described components, in particular for the backrest longitudinal supports and the at least one backrest cross strut. Generally, however, said components will consist of a metal and/or a resilient material, preferably plastics material.

According to one embodiment, the at least one backrest cross strut is arranged in the upper third, preferably in the upper quarter, of the backrest in relation to the vertical direction of the backrest. In the process, the at least one backrest cross strut can be arranged on the side, at the upper ends of the backrest longitudinal supports, to the rear in relation to a seat longitudinal direction and/or inside the backrest longitudinal support. In this case, upper ends can be considered as an upper end region or the actual upper end of the backrest longitudinal support. Although an arrangement at the front is conceivable, this can lead to pressure against the driver's back and thus to a less comfortable seating position. If, however, the cushion is sufficiently thick and/or the backrest cross struts consist of a resilient material, the backrest cross strut can be prevented from pushing against the back.

It is advantageous in terms of the stability of the backrest to arrange the at least one backrest cross strut in the upper third or upper quarter or in a region located even higher respectively. In particular when the backrest longitudinal supports consist of a resilient material, it is thus possible to prevent the backrest longitudinal supports from snapping, for example backwards in relation to the seat longitudinal direction, as a result of a force acting on the driver's body.

Additional advantageous embodiments can be found in the dependent claims.

Additional aims, advantages and expediencies of the present invention emerge in the following from the description in conjunction with the drawings, in which:

FIG. 1 is a schematic front view of a vehicle seat according to the invention in a first position, said seat comprising a seat part and a backrest which comprises a left-hand backrest longitudinal support, a right-hand backrest longitudinal support, a middle backrest longitudinal support and a backrest cross strut;

FIG. 2 is a schematic view of the vehicle seat according to FIG. 1 in a second position;

Figures 1, 2:
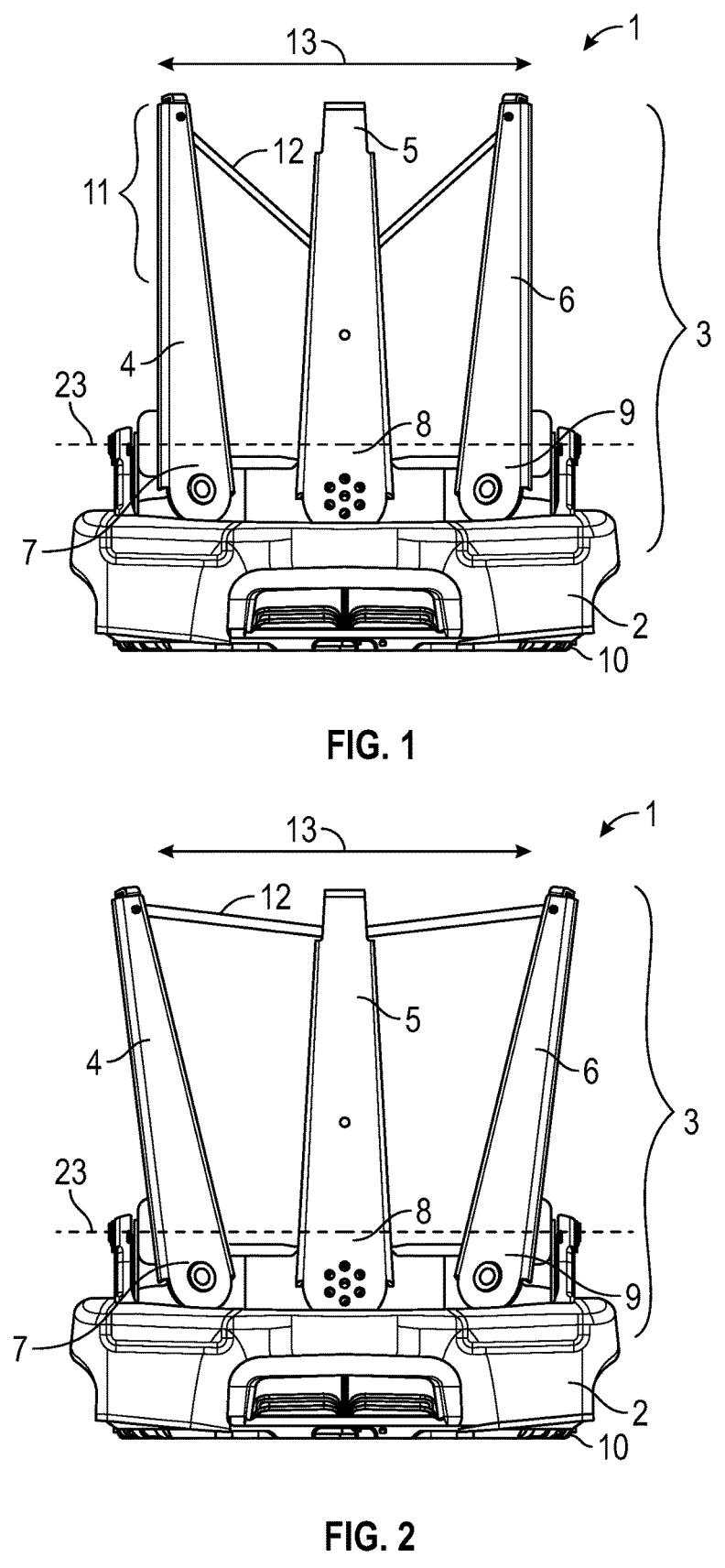
Figure 3:
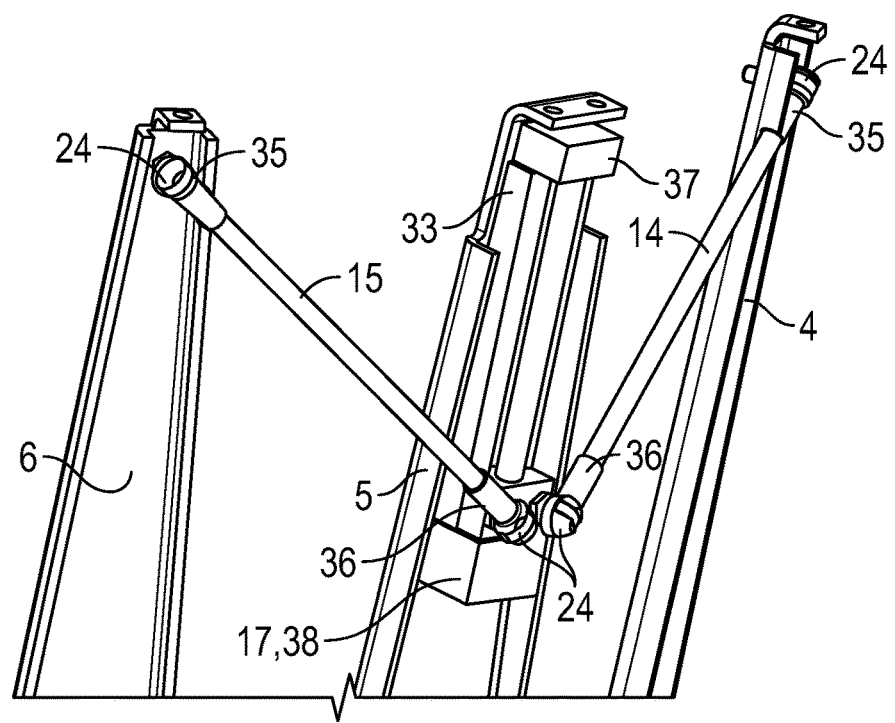
FIG. 3 is a schematic rear view of the backrest in a first position.

The vehicle seat 1 shown in a schematic front view in FIG. 1 comprises a seat part 2 and a backrest 3. The backrest 3 comprises a left-hand backrest longitudinal support 4, a middle backrest longitudinal support 5 and a right-hand backrest longitudinal support 6, and at least one cross strut 12 which is arranged in an upper region 11. In this respect, the backrest longitudinal supports are each connected in a lower end region 7, 8, 9 to the seat part 2 or the seat-part frame 10 respectively. The backrest 3 can in this respect pivot about a pivot axis 23, which extends substantially in the width direction of the seat. By way of example, FIG. 1 shows a distance 13 by means of the left-hand backrest longitudinal support 4 and the right-hand backrest longitudinal support 6. The distance 13 could, however, also be defined by a different combination of backrest longitudinal supports. In this case, the seat 1 is in a first position.

The vehicle seat 1 shown in FIG. 2 substantially corresponds to the vehicle seat which can be seen in FIG. 1. In FIG. 2, however, the at least one backrest cross strut 12 has been displaced upwards, in a central region, in relation to the vertical direction of the backrest, it also being conceivable for the at least one backrest cross strut to be displaced at one end region or both end regions. As can be clearly seen, the distance has increased as a result of this displacement. In addition, the left-hand backrest longitudinal support 4 and the right-hand backrest longitudinal support 6 have been swiveled. If the at least one backrest cross strut is displaced out of the second position, as shown in FIG. 2, back into the first position, as shown in FIG. 1, the backrest longitudinal supports 4, 6 would in turn also pivot back.

Figure 4:
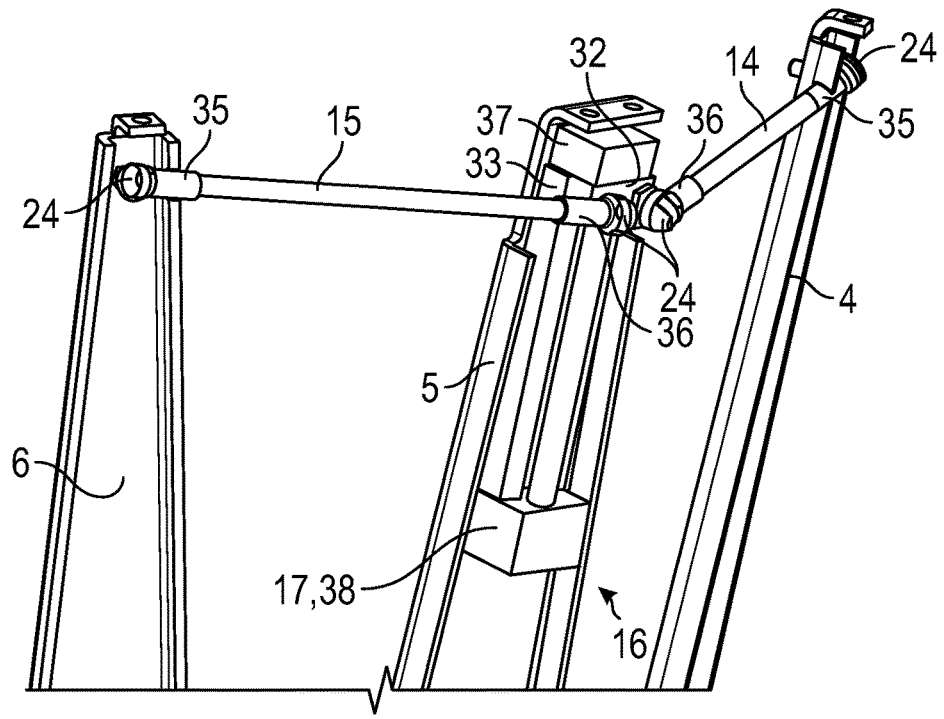
FIG. 4 is a schematic rear view of the backrest in a second position.

FIGS. 3 and 4 are schematic rear views of the backrest comprising a displacement device 16. In this embodiment, a first backrest cross strut 14 and a second backrest cross strut 15 are provided and are hingedly connected by their second ends 36 to the backrest longitudinal supports 4, 5, 6 by means of link joints 24. In this case, the connections to the left-hand backrest longitudinal support 4 and the right-hand backrest longitudinal support 6 are fixed, and the connections to the middle backrest longitudinal support 5 are fastened on a moving element 32. The moving element 32 moves in the vertical direction of the backrest and is guided in a guide rail 33, thereby ensuring reliable guidance of the moving element and thus of the backrest cross struts 14, 15. In this example, a rod 30 which additionally guides the movement of the moving element 32 is also provided in addition to the guide rail 33. Here, the moving element 32 surrounds the rod 30 in a plane which is substantially perpendicular to the rod 30. The upward movement is limited by a first limiting element 37 and the downward movement is limited by a second limiting element 38. In this case, FIG. 3 shows the backrest in a first position and FIG. 4 shows the backrest in a second position.

In FIGS. 3 and 4, the second limiting element is equivalent to the motor 17. In other words, the movement of the moving element 32 is in fact limited downwards by the motor 17. However, it is also conceivable for the motor 17 and the second limiting element 38 to be different, i.e. for it to be possible to provide two separate components. It is naturally also conceivable for the motor to be attached to the middle backrest longitudinal support 5 at the top in relation to the vertical direction of the backrest, rather than at the bottom.

As already mentioned, the moving element 32 moves downwards and upwards in relation to the vertical direction of the backrest in a manner guided by the guide rail 33, and is moved by a motor, preferably electrically, as shown in FIGS. 3 and 4. However, it is also conceivable for the moving element 32 to not be driven by a motor, but also for said element to be able to be manually displaced in the vertical direction of the backrest.

Figure 5:
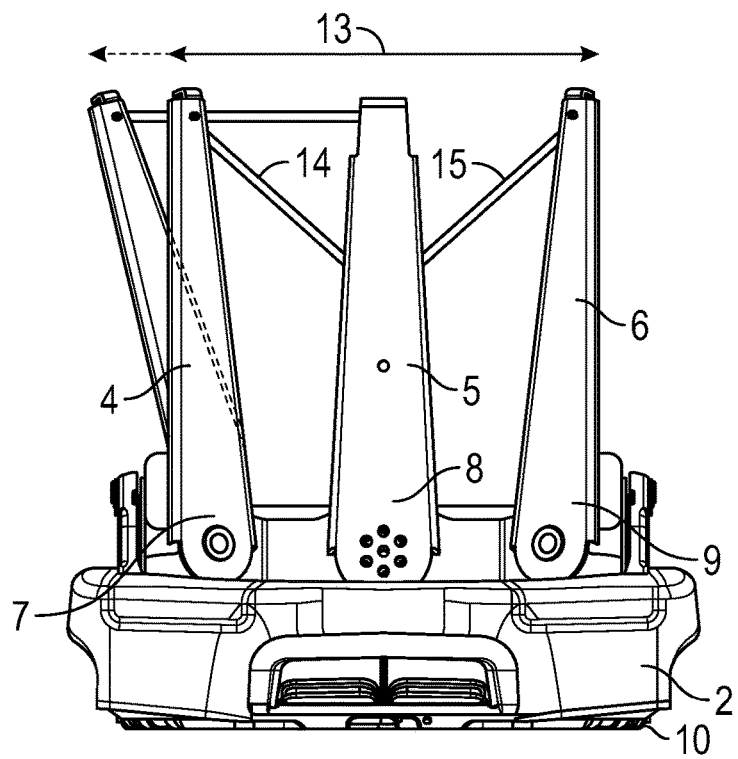
FIG. 5 is a schematic front view of the vehicle seat, the position of only one backrest cross strut having been changed.

As can be clearly seen in FIG. 5, it is also conceivable to design the displacement device 16 in such a way that the first backrest cross strut 14 and the second backrest cross strut 15 can be moved separately from one another. FIG. 5 shows an example of this. In this figure, the second backrest cross strut 15 remains in its original position, while the position or location respectively of the first backrest cross strut changes. In this case, the second end 36 of the second backrest cross strut 14 moves from a lower position to an upper position, as a result of which the left-hand backrest cross strut 4 is moved outwards away from the middle backrest. In FIG. 5, the distance 13 thus only changes on the left-hand side of the backrest. When in a working position, the driver is thus able to adjust the width of the backrest 3 according to his body shape and/or comfort.

FIG. 6 to 9 demonstrate various embodiments or designs respectively of the displacement device 16. The displacement device 16 having the first backrest cross strut 14 and the second backrest cross strut 15 and the moving element 32 is in a lower position in each case. Here, the backrest longitudinal supports 4, 5, 6 are U-shaped and therefore, as a result of the attachment to the rear side of the backrest longitudinal supports 4, 5, 6, recesses also have to be provided in the sides at which the backrest cross struts 14, 15 leave the U-profile, in such a way as to also ensure movement of the backrest cross struts 14, 15 downwards and upwards. Alternatively, relatively small recesses may also be possible if the material of the backrest longitudinal supports 4, 5, 6 surrounding the backrest cross struts 14, 15 consists of a robust yet flexible material.

Figure 6:
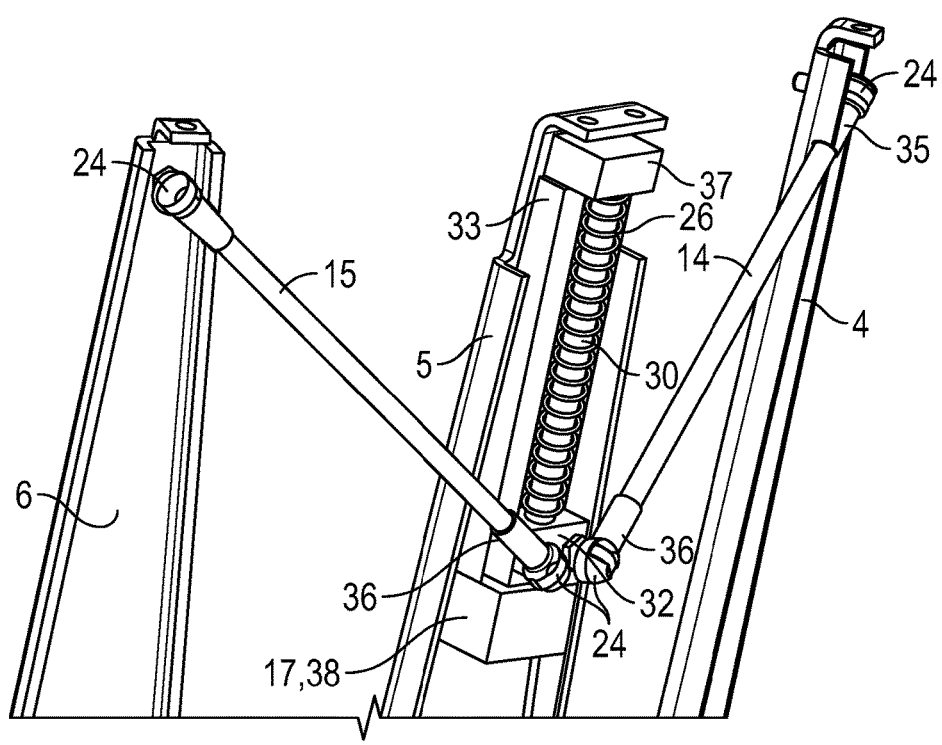
FIG. 6 shows a displacement device having a spring element.

FIG. 6 shows the displacement device comprising a spring element 26, which, as shown in FIG. 6, is arranged around the rod 30, other arrangements of the spring element 26 also being conceivable. It is possible for the spring element 26 to be connected to the first limiting element 37 and the moving element 32. In this case, the moving element 32 can also be moved by motor or by hand. In the process, the additional spring element 26 makes it possible to position the moving element 32 more effectively, since good positioning of the moving element 32 is achieved as a result of the spring force exerted by the spring element 26, together with the frictional force present between the guide rail 33 and the moving element 32. At the same time, however, simple movement or displacement respectively of the moving element 32 in the vertical direction of the backrest is still possible.

Figure 7:
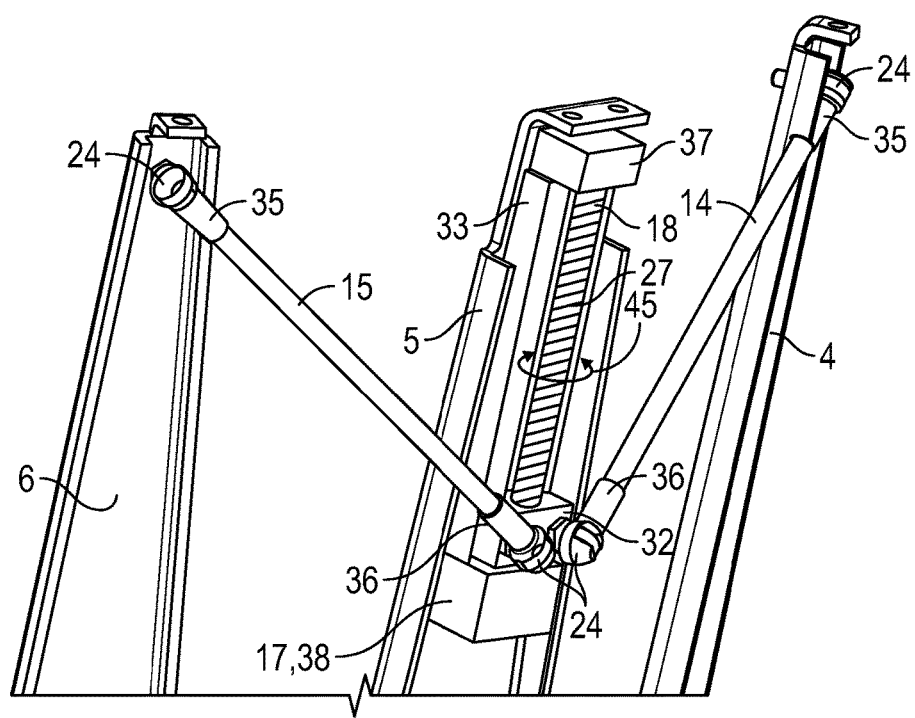
FIG. 7 shows a displacement device having a rotary spindle.

FIG. 7 shows the displacement device 16, wherein the rod 30 is designed as a rotary spindle 18 which has a thread 27 and is rotatably connected to both the first limiting element 37 and the motor 17 (when provided). In this case, the moving element 32 comprises a thread which is connected to the rotary spindle 18. The rotary spindle 18 can thus be rotated by the motor 17. The moving element 32 is moved downwards or upwards by the rotation of the rotary spindle, depending on the direction of rotation 41 and the type of thread. The moving element 32 is prevented from rotating therewith by the guide rail 33. If the rotary spindle does not rotate, the moving element 32 remains in its relative position in relation to the rotary spindle 18. Movement of the moving element 32 is thus only possible when the rotary spindle completes a rotation. If no motor is provided, the rotary spindle can, for example, be equipped with a crank (not shown here) which, for example, is connected to the rotary spindle 18 at the first limiting element 37 in the axial direction of the rotary spindle 18. The rotary spindle 18 is thus rotated by operating the crank.

It is also conceivable for a recirculating ball screw to be used instead of a rotary spindle 18 having a thread 27.

Figure 8:
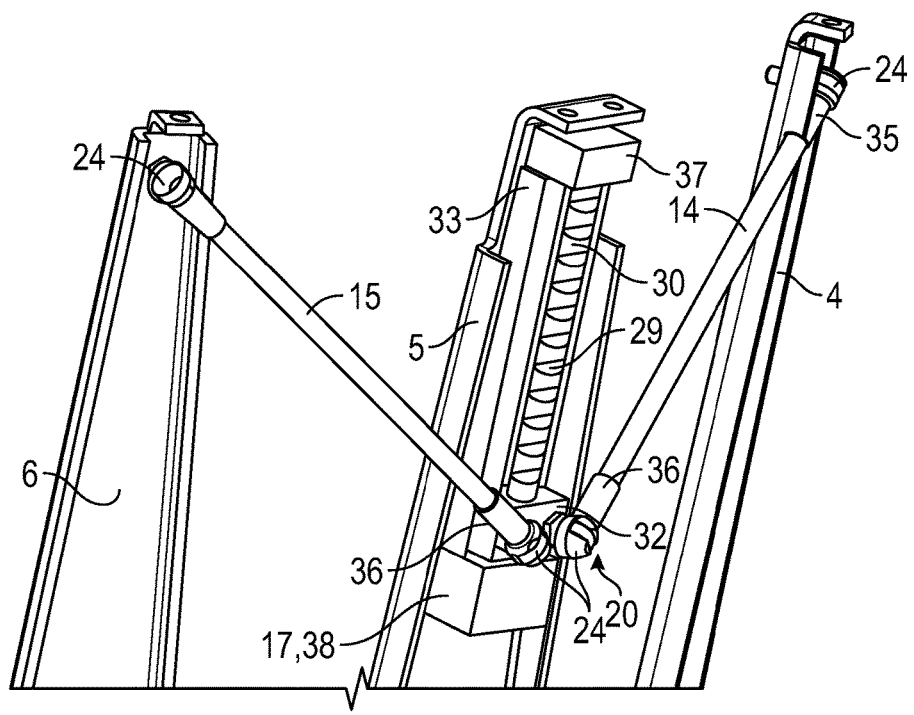
FIG. 8 shows a displacement device having a snap-in apparatus.

FIG. 8 shows the displacement device 16 having a snap-in apparatus 20, the rod 30 comprising catches 29. The catches 29 can be arranged in any manner, preferably at fixed distances. In this case, the moving element 32 comprises a snap-in means (not shown here) which can snap into the catches 29, and the connection of the catches 29 to the snap-in means can be released again in a simple manner.

Figure 9:
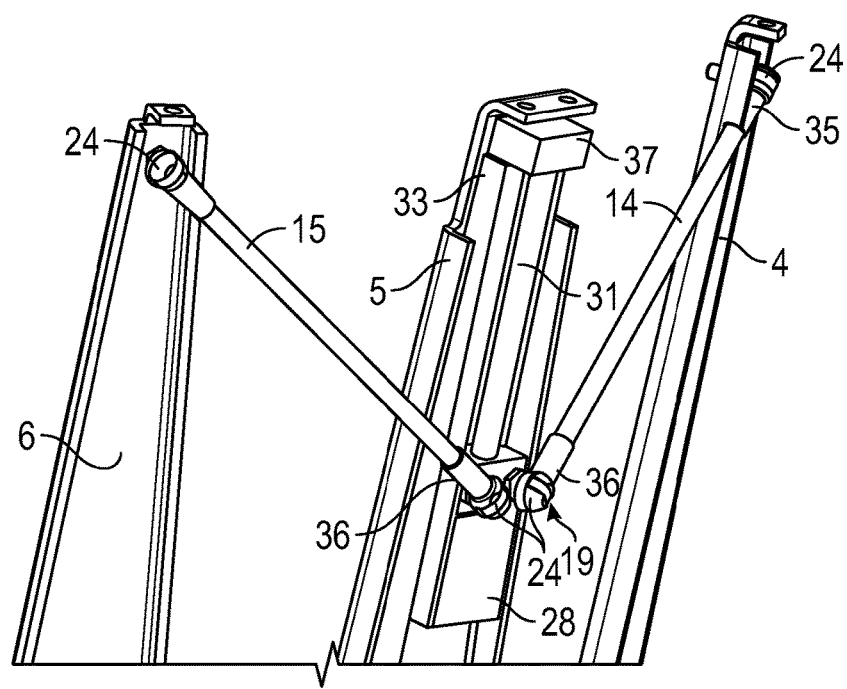
FIG. 9 shows a displacement device having a pneumatic lifting cylinder.

FIG. 9 shows a further embodiment of the displacement device 16. Said device comprises a pneumatic cylinder 19, which comprises a working cylinder 28 and a piston 31. The piston 31 is connected to the first limiting element 37; the working cylinder 28 moves in the vertical direction of the backrest in a manner guided by the guide rail 33. The first backrest cross strut 14 and the second backrest cross strut 15 are connected by their second ends 35 to the working cylinder 28. In this case, the pneumatic cylinder 19 can have many different designs, e.g. in the form of a single-action or double-action cylinder.

FIG. 10A-10E show a series of different embodiments of the guide rail 33. It goes without saying that these views are not definitive, since a person skilled in the art is also aware of further possibilities for designing the guide rails, different from the embodiments shown.

Figure 10A:
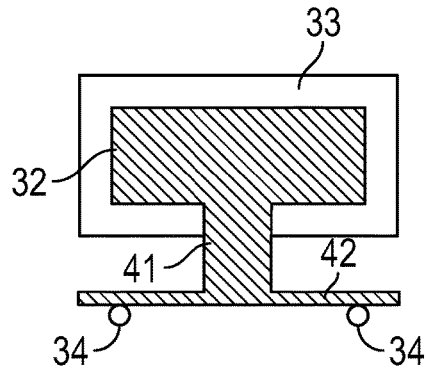
FIG. 10A-10E show various designs of the guide rail and the moving element.
Figure 10B:
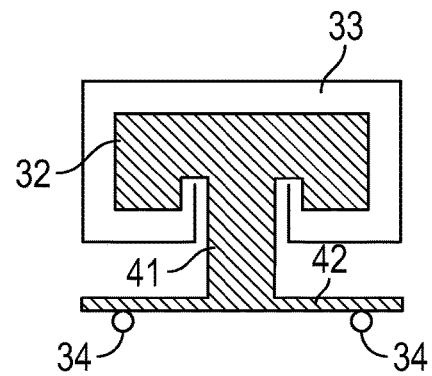

For example, in FIG. 10A or 10B the moving element 32 is largely arranged within the guide rail 33, although a protruding element 41 is located outside the guide rail 33, on which element an attachment element 42 is provided, to which the backrest cross struts 14, 15 can be fastened by their second ends 36 in attachment points.

Figure 10C:
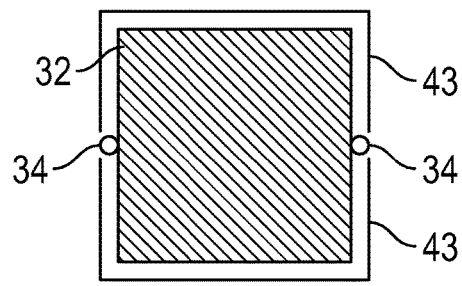
Figure 10D:
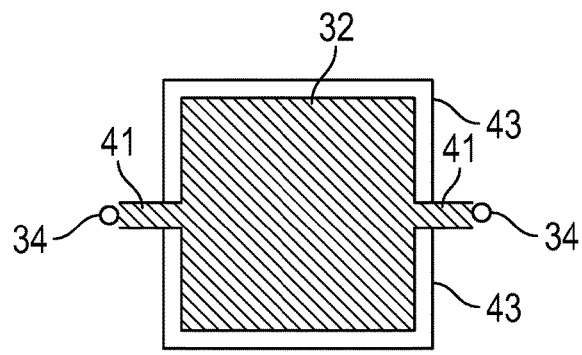

The guide rail 33 can also be designed in multiple parts, as can be seen in FIGS. 10C and 10D. In this case, two C-shaped components 43 substantially enclose the moving element. Here, the C-shaped components are not tightly interconnected, but rather are arranged at a distance from one another so as to produce a slot, whereby the backrest cross struts 14, 15 can be connected to the moving element. The two ends 36 of the backrest cross struts can be attached within the guide rail (FIG. 10C) or outside the guide rail (FIG. 10D).

Figure 10E:
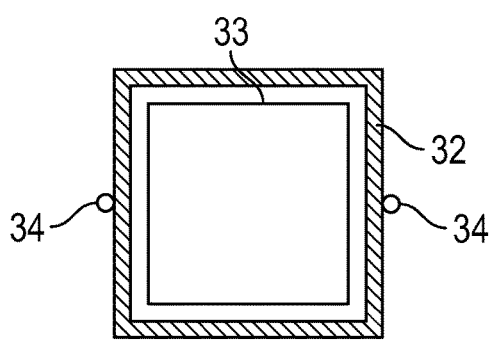

In FIG. 10E, the guide rail is enclosed by the moving element 32.

Figure 11:
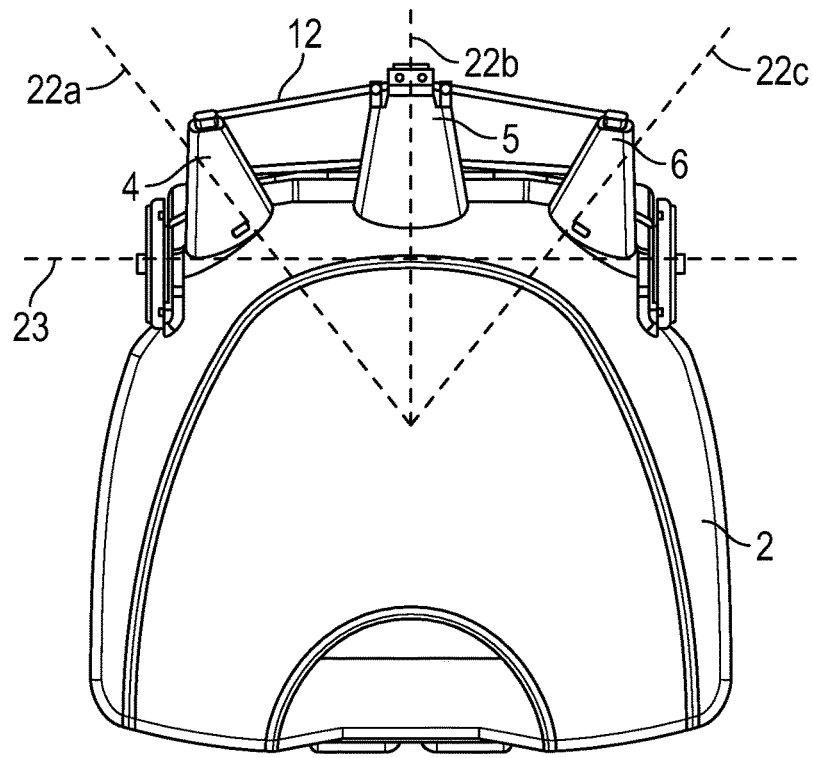
FIG. 11 is a schematic plan view of the vehicle seat with the backrest in a first position.
Figure 12:
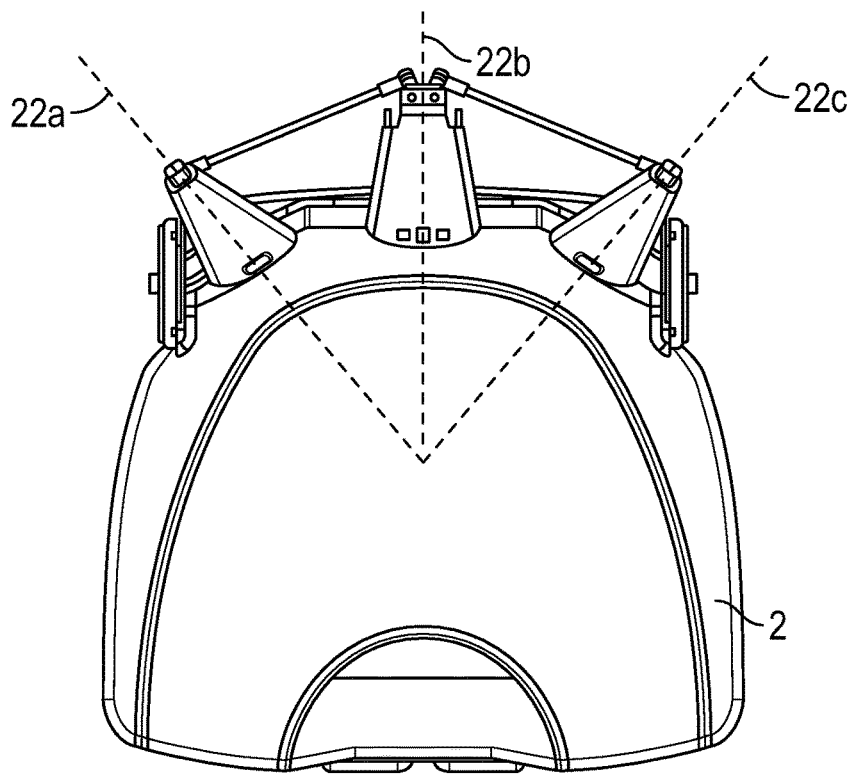
FIG. 12 is a schematic plan view of the vehicle seat with the backrest in a second position.

Lastly, FIGS. 11 and 12 are schematic plan views of the vehicle seat 1. In these figures, the backrest longitudinal supports 4, 5, 6 can pivot about their respective pivot axis 22a, 22b, 22c. FIG. 11 shows the backrest in the first position 39; FIG. 12 shows the backrest in the second position 40. In the process, it is also possible for the backrest longitudinal supports 4, 5, 6 to each be locked so that swiveling about the axis of rotation 22a, 22b, 22c is no longer possible.

As can be seen by comparing FIGS. 11 and 12, the pivot axes 22a, 22b, 22c are in a common plane but are not parallel to one another. In particular, the middle backrest longitudinal support 5 is arranged further to the rear than the left-hand backrest longitudinal support 4 and the right-hand backrest longitudinal support 6. The hinged connection therefore has to be designed such that the longitudinal supports are not only able to pivot about an axis parallel to the pivot axis, but also about an axis which extends in the width direction of the seat or at an angle transversely to the width direction of the seat. In the case shown, the second ends 36 or the hinged connection respectively thus rotates about a combination of the axis extending in parallel with the pivot axes and the axis extending at an angle transversely to the width direction of the seat. Such a movement can, for example, be permitted by a ball joint or a universal joint.

By arranging the backrest longitudinal supports 4, 5, 6 in this manner, i.e. with the middle backrest longitudinal support 5 being arranged further to the rear in the longitudinal direction of the seat than the left-hand backrest longitudinal support 4 and the right-hand backrest longitudinal support 6 and with the pivot axes not being parallel, the backrest 3 is already adapted when the seat is in an unswiveled position, thereby allowing for comfortable sitting.

All the features disclosed in the application documents are claimed as being essential to the invention, provided that they are novel over the prior art either individually or in combination.

LIST OF REFERENCE NUMERALS

1 Vehicle seat
2 Seat part
3 Backrest
4 Left-hand backrest longitudinal support
5 Middle backrest longitudinal support
6 Right-hand backrest longitudinal support
7 Lower end region
8 Lower end region
9 Lower end region
10 Seat-part frame
11 Upper region
12 Backrest cross strut
13 Distance
13a Changed distance
14 First backrest cross strut
15 Second backrest cross strut
16 Displacement device
17 Motor
18 Rotary spindle
19 Lifting cylinder
20 Snap-in apparatus
21 Upper end
22a Pivot axis
22b Pivot axis
22c Pivot axis
23 Pivot axis of the backrest
24 Link joint
26 Spring element
27 Thread
28 Working cylinder
29 Catches
30 Rod
31 Piston
32 Moving element
33 Guide rail
34 Attachment points
35 First end
36 Second end
37 First limiting element
38 Second limiting element
39 First position
40 Second position
41 Protruding element
42 Attachment element
43 C-shaped component

The invention claimed is:

1. A vehicle seat comprising a seat part and a backrest, the backrest comprising at least one left-hand backrest longitudinal support extending in the vertical direction of the backrest, at least one middle backrest longitudinal support extending in the vertical direction of the backrest and at least one right-hand backrest longitudinal support extending in the vertical direction of the backrest, the backrest longitudinal supports each being connected to the seat part or a seat-part frame in a lower region,
wherein the backrest longitudinal supports are hingedly connected in their lower end regions to the seat part or the seat-part frame and are interconnected by at least one elongate backrest cross strut arranged in an upper region of the backrest, it being possible to vary a distance between upper ends of at least two backrest longitudinal supports by displacing an end of the at least one elongate backrest cross strut along the vertical direction of the at least one middle backrest longitudinal support.

2. The vehicle seat according to claim 1,
wherein a first elongate backrest cross strut is arranged between the left-hand backrest longitudinal support and the middle backrest longitudinal support and a second elongate backrest cross strut is arranged between the right-hand backrest longitudinal support and the middle backrest longitudinal support and an end of at least one of the first elongate backrest cross strut and the second elongate backrest cross strut is displaceable in the vertical direction of the at least one middle backrest longitudinal support.

3. The vehicle seat according to claim 2,
wherein the first elongate backrest cross strut is fastened by a first end to the left-hand backrest longitudinal support and by a second end to the middle backrest longitudinal support and the second elongate backrest cross strut is fastened by a first end to the right-hand backrest longitudinal support and by a second end to the middle backrest longitudinal support.

4. The vehicle seat according to claim 1, wherein the at least one elongate backrest cross strut is fastened to the backrest longitudinal supports in at least one of a hinged and displaceable manner.

5. The vehicle seat according to claim 3, wherein the second ends of the first elongate backrest cross strut and of the second elongate backrest cross strut are attached in a displaceable manner.

6. The vehicle seat according to claim 1, wherein the at least one elongate backrest cross strut is displaced along the vertical direction of the at least one middle backrest longitudinal support by means of a displacement device.

7. The vehicle seat according to claim 6, wherein the at least one displacement device is attached to the middle backrest longitudinal support.

8. The vehicle seat according to claim 6, wherein the at least one displacement device comprises at least one of (i) at least one motor which can travel along the vertical direction of the at least one middle backrest longitudinal support, (ii) at least one rotary spindle, (iii) at least one pneumatically operated lifting cylinder, (iv) at least one spring element and (v) at least one snap-in apparatus.

9. The vehicle seat according to claim 1, wherein the at least one elongate backrest cross strut is arranged on at least one of (i) the side, (ii) on upper ends of the backrest longitudinal supports, (iii) on the backrest longitudinal supports to the rear in relation to a seat longitudinal direction, and (iv) inside the backrest longitudinal supports.

10. The vehicle seat according to claim 1, wherein the at least one elongate backrest cross strut is permanently or releasably connected to the backrest longitudinal supports.

11. The vehicle seat according to claim 1, wherein the at least one elongate backrest cross strut is arranged in the upper third of the backrest in relation to the vertical direction of the at least one middle backrest longitudinal support.

12. The vehicle seat according to claim 11, wherein the at least one elongate backrest cross strut is arranged in the upper quarter of the backrest in relation to the vertical direction of the at least one middle backrest longitudinal support.

13. A vehicle seat, comprising:

a seat part having a seat part frame;

a left support, a middle support, and a right support, wherein each support has a lower end pivotally connected to the seat part frame, and each support has an upper end, and wherein the middle support has a guide rail and a moving element configured to move along the guide rail between a first position and a second position along a longitudinal length of the middle support;

a left cross strut having a first end connected to the upper end of the left support and a second end connected to the moving element; and a right cross strut having a first end connected to the upper end of the right support and a second end connected to the moving element.

14. The vehicle seat according to claim 13, wherein a first distance between the upper ends of the left support and the middle support and between the uppers ends of the right support and the middle support changes to a second distance as the moving element moves along the guide rail between the first position and the second position.

15. The vehicle seat according to claim 14, further comprising:

a displacement device configured to move the moving element between the first position and the second position.

16. The vehicle seat accordingly to claim 14, wherein the first position of the moving element is at the upper end of the middle support, and the second position of the moving element is between the upper end and the lower end of the middle support, and wherein the first distance is larger than the second distance.

\* \* \* \* \*